United States Patent [19]

Kido et al.

[11] Patent Number: 4,805,036
[45] Date of Patent: Feb. 14, 1989

[54] SYNCHRONIZATION OF PLURAL VIDEO REPRODUCING SYSTEMS

[75] Inventors: Kazuyuki Kido; Harumi Horiuchi, both of Kanagawa, Japan

[73] Assignee: Group-N Corporation, Kanagawa, Japan

[21] Appl. No.: 51,337

[22] Filed: May 19, 1987

[30] Foreign Application Priority Data

May 19, 1986 [JP] Japan .................................. 61-114255

[51] Int. Cl.[4] ............................................. H04N 5/76
[52] U.S. Cl. .................................... 358/335; 358/148; 358/337; 358/338; 360/26
[58] Field of Search ............... 358/310, 335, 320, 321, 358/322, 342, 323, 337, 338, 148, 149, 181, 182, 183; 360/33.1, 36.1, 14.1, 26, 55

[56] References Cited

U.S. PATENT DOCUMENTS 3,928,719 12/1975 Sasabe et al. ..................... 358/83
4,554,582 8/1983 Wine .................................. 358/149

Primary Examiner—Robert L. Richardson
Attorney, Agent, or Firm—Robbins & Laramie

[57] ABSTRACT

A method of and an apparatus for synchronizing reproduction using a plurality of video information reproducing systems are arranged such that synchronization pulses contained in video signals are integrated for each recording medium using as a starting point a required video position identifying signal recorded on each recording medium, and integrated values are made to coincide with each other, thereby allowing the video information of all the recording media to be reproduced synchronously. Thus, since synchronization of reproduction is effected while the reproducing systems are operating, there is no need to temporarily stop the reproducing systems as has been done conventionally. Consequently, if it is possible to effect synchronous reproduction even in the case of a CLV-type disk which cannot be temporarily stopped. In addition, the time duration required for synchronization can be reduced.

15 Claims, 3 Drawing Sheets

SYNCHRONIZATION OF PLURAL VIDEO REPRODUCING SYSTEMS

BACKGROUND OF THE INVENTION

1. Field of the Invention

The present invention relates to a method of and an apparatus for synchronizing reproduction using a plurality of video information reproducing systems, and, more particularly, to a method of and an apparatus for synchronization in reproducing video information recorded in a plurality of video information reproducing systems by synchronizing said video information.

2. Description of the Prior Art

A synchronizing system of this type is adopted in a system for reproducing a plurality of items of video information on a plurality of screens by synchronizing said video information, such as a multi-screen display system. If video tape recorders are used as reproducing systems, this type of multi-screen display system is arranged such that, after temporarily stopping each video tape recorder at a position represented by a program search mark recorded on a tape, all the video tape recorders are restarted simultaneously from these positions. Incidentally, a system similar to the above-described prior art is disclosed in Japanese Patent Laid-Open No. 150160/1982. In such a system, in order to eliminate discrepancies in synchronization resulting from differences in the rise characteristics of reproducing systems, the following arrangement is generally adopted. By supplying from the outside a synchronization signal which serves as a reference, the phase difference between the synchronization signal and a reproduction synchronizing signal is detected, and motor rotation servo systems of the reproducing systems are so controlled that the phase difference becomes zero.

Meanwhile, if video disk players are used as reproducing systems in the aforementioned multi-screen display system, a CAV-type disk with a constant angular velocity is employed, each pickup is temporarily stopped at the position of a required video frame number, and synchronization is obtained by simultaneously starting the video disk players after placing all the pickups at the same position.

If video tape recorders are used as reproducing systems in the aforementioned multi-screen display system, a troublesome procedure is required in which, after the reproducing systems have been temporarily stopped, they are restarted, and synchronization is finally adjusted by an external synchronizing system. On the other hand, if video disk players are used as reproducing systems, there are no discrepancies in synchronization resulting from differences in rise characteristics in the case of a CAV-type disk, unlike video tape recorders, so that no external synchronizing system is required. Nevertheless, there is one problem that remains unsolved which is that after the video disk players have been temporarily stopped, they need to be restarted started simultaneously from the same position.

For this reason, in the case of disks in which pickups cannot be stopped temporarily midway through a disk like a CLV-type disk (a long-playing disk) whose linear velocity at the pickup position is constant, it is impossible to effect synchronization and this has been a significant problem.

SUMMARY OF THE INVENTION

Accordingly, an object of the present invention is to provide a method of and an apparatus for synchronizing reproduction using a plurality of video information reproducing systems and which is capable of synchronizing a plurality of items of video information without needing to temporarily stop the plurality of reproducing systems and which is thereby capable of synchronizing disks that are not provided with temporary stop functions.

To this end are provided a method of and apparatus for synchronizing video information using a plurality of video information reproducing systems which are capable of reproducing video information which has been recorded in advance in respective recording media, wherein synchronization pulses in the video information are integrated for each reproducing system using as a starting point a required video position identifying signal for obtaining synchronization among the various items of video information, and the reproduction speed of each reproducing system is controlled in such a manner that the respective integrated values coincide with each other.

The present invention offers the advantages that a plurality of items of video information can be synchronized without temporarily stopping the plurality of reproducing systems. In addition, since there is no need to effect a temporary stop, there is a significant advantage in that a CLV-type disk (a long-playing disk) which is not provided with the function of a temporary stop can be synchronized. Furthermore, there is an additional advantage in that the time required for synchronization can be reduced.

DETAILED DESCRIPTION OF THE INVENTION

Referring now to the accompanying drawings, description will be made of an embodiment of the present invention.

Figure 1:
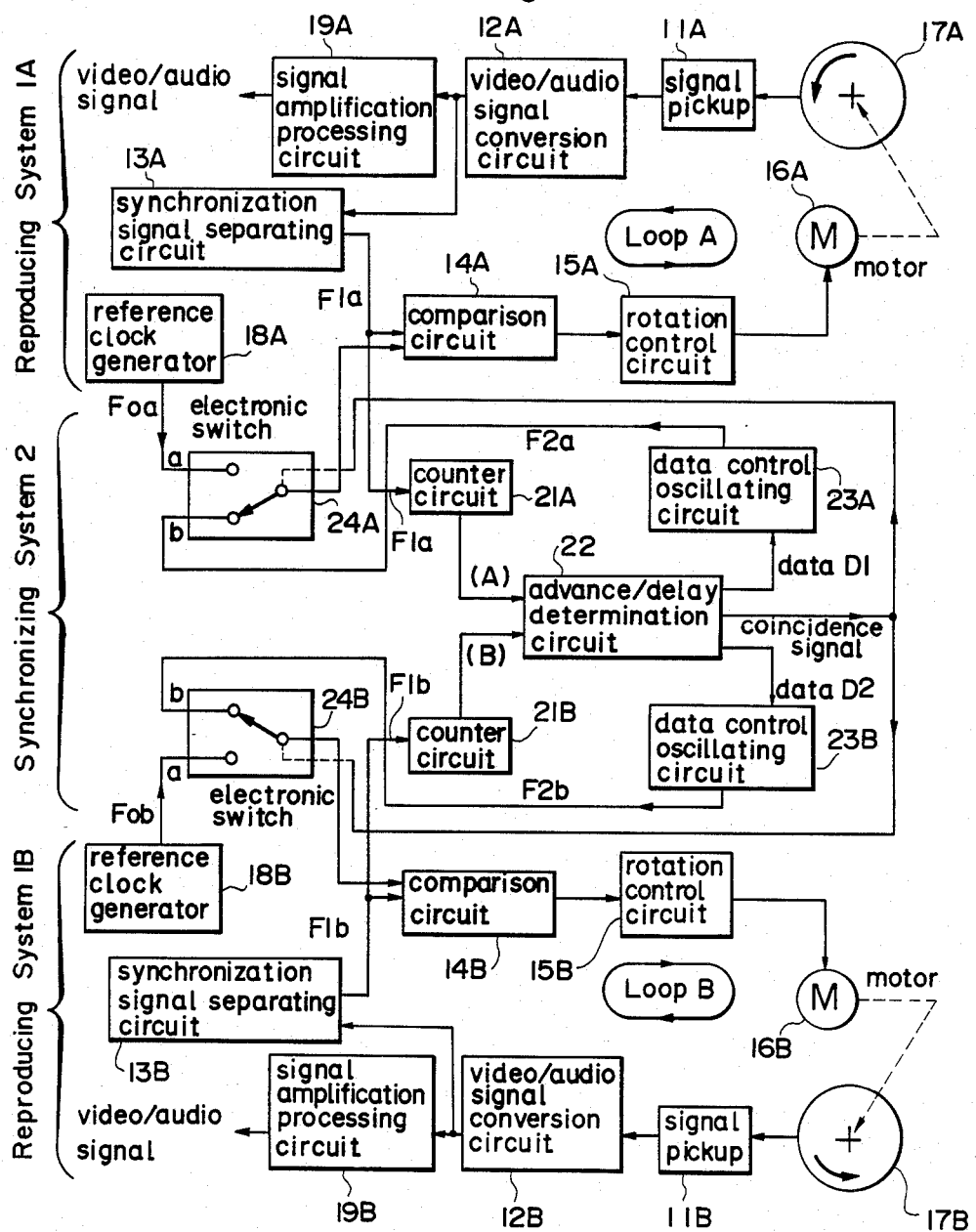
FIG. 1 is a block diagram illustrating an embodiment in which a synchronizing system in accordance with the present invention is applied to two reproducing systems.

FIG. 1 is a block diagram illustrating an embodiment in which a synchronizing system in accordance with the present invention is applied to two video disk players.

In FIG. 1, this embodiment comprises a first reproducing system 1A, a second reproducing system 1B, and a synchronizing system 2 for synchronizing the reproducing systems 1A, 1B.

The first reproducing system 1A comprises a signal pickup 11A for picking up signals; a video/audio signal conversion circuit 12A for forming video/audio signals on the basis of signals from the pickup 11A; a synchronization signal separating circuit 13A for separating a horizontal synchronization pulse $F_1a$ from video signals from the conversion circuit 12A; a comparison circuit 14A which compares the synchronization pulse $F_1a$ from the separating circuit 13A and a reference clock pulse $F_0a$ and outputs a signal representing a deviation thereof; a rotation control circuit 15A for outputting a rotational speed control signal in response to the deviation signal from the comparison circuit 14A; a motor 16A whose rotation is controlled by a control signal from the control circuit 15A; a video disk 17A which is driven by the motor 16A; a reference clock generator 18A for supplying the reference clock pulse $F_0a$ to the comparison circuit 14A; and a signal amplification processing circuit 19A for effecting amplification and the like of video/audio signals from the conversion circuit 12A.

Like the first reproducing system 1A, the second reproducing system 1B comprises a signal pickup 11B; a video/audio signal conversion circuit 12B; a synchronization signal separating circuit 13B for separating a horizontal synchronization pulse $F_1b$ from video signals; a comparison circuit 14B; a rotation control circuit 15B; a motor 16B; a video disk 17B; a reference clock generator 18B for generating a reference clock pulse $F_0b$; and a signal amplification processing circuit 19B.

The synchronizing system 2 comprises counter circuits 21A, 21B for counting synchronization pulse signals $F_1a$, $F_1b$ from the synchronization signal separating circuits 13A, 13B; an advance/delay determination circuit 22 for determining whether counts from the counter circuits 21A, 21B are advanced or delayed; data control oscillating circuits 23A, 23B for respectively fetching data D1, D2 from the advance/delay determination circuit 22 and for respectively generating frequencies $F_2a$, $F_2b$ corresponding to the data D1, D2, respectively; and electronic switches 24A, 24B for supplying either of the reference clock pulses $F_0a$, $F_0b$ from the reference clock generators 18A, 18B or output signals $F_2a$, $F_2b$ from the oscillating circuits 23A, 23B to the comparison circuits 14A, 14B.

The operation of the foregoing embodiment will be described hereafter.

<Operation of Video Disk Player as Single Unit>

Description will be made of a case where the video disk player per se is operated as a single unit.

When the electronic switch 24A is turned to the 'a' side, the synchronizing system 2 is cut off, and the video disk player is operated as a single unit.

The video disk 17A is rotated by the motor 16A. Original video/audio signals are detected from the rotating video disk 17A by means of the signal pickup 11A. The detected original video/audio signals are converted into video/audio signals by means of the video/audio signal conversion circuit 12A. The video/audio signals from the conversion circuit 12A are applied to the synchronization signal separating circuit 13A, where the horizontal synchronization pulse $F_1a$ is separated. The horizontal synchronization pulse $F_1a$ is proportional to the angular velocity in the case of a CAV-type disk and to the linear velocity at the pickup position in the case of a CLV-type disk.

The horizontal synchronization pulse $F_1a$ is compared with the reference clock pulse $F_0a$ from the reference clock generator 18A by means of the comparison circuit 14A. In the case of NTSC color system, the pulse repeated frequency of the reference clock pulse $F_0a$ is 15.734 KHz. If there is a frequency difference between the pulses $F_1a$ and $F_0a$, a signal corresponding to that difference is supplied to the rotation control circuit 15A. The rotation control circuit 15A controls the rotation of the motor 16A on the basis of said input signal. The rotation control circuit 15A increases or decreases the rotational speed of the motor 16A in such a manner that the pulse $F_1a$ will coincide with the pulse $F_0a$, and for instance, in the case of $F_1a > F_0a$, the rotation control circuit 15A decreases the rotational speed of the motor 16A until $F_1a = F_0a$. Thus a loop A consisting of the signal pickup 11A, the video/audio signal conversion circuit 12A, the synchronization signal separating circuit 13A, the comparison circuit 14A, the rotation control circuit 15A, the motor 16A, the video disk 17A, and the signal pickup 11A in circuit forms a servo system for controlling the rotational speed of the motor, and the rotational speed is thereby maintained constantly at a predetermined value.

In addition, an output signal from the video/audio signal conversion circuit 12A is output to an external system via the signal amplification processing circuit 19A.

Since the above-described operation is similar in the case of the reproducing system 1B as well, description thereof will be omitted.

<Operation Using Synchronizing System 2>

Figure 2:
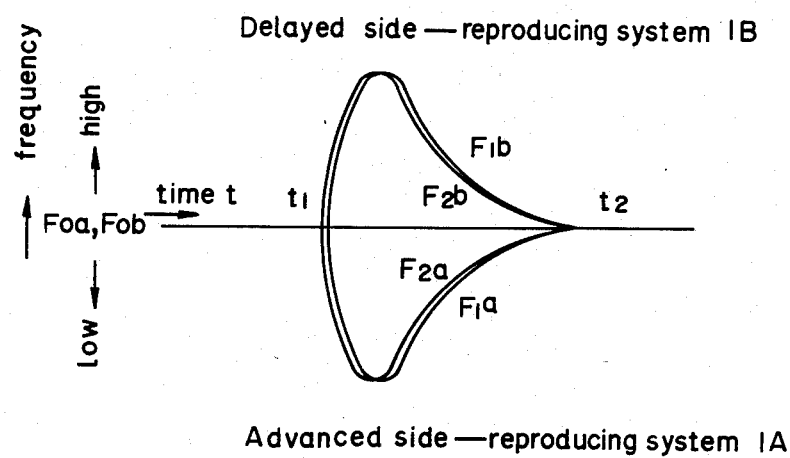
FIG. 2 is a time chart illustrating said operation.

Referring to FIG. 2 as well, description will be made hereafter of a case where the synchronizing system 2 in accordance with the present invention is used.

Turning of the electronic switches 24A, 24B to the 'b' sides, respectively, connects the reproducing systems 1A, 1B and the synchronizing system 2.

The reproducing systems 1A, 1B are started. Since the frequencies $F_2a$, $F_2b$ outputs from the oscillating circuits 23A, 23B are supplied to the comparison circuits 14A, 14B, the rotational speeds of the motors 16A, 16B of the reproducing systems 1A, 1B are gradually increased to coincide with the same, and soon reach a steady state. This is because, when the data D1, D2 have not been input to the data control oscillating circuits 23A, 23B, input terminal portions thereof are kept at fixed bias voltages, and the output frequencies $F_2a$, $F_2b$ are set to be equivalent to the frequencies $F_0a$, $F_0b$ of the reference clock pulses, or those that are very close thereto. Here, the frequencies $F_0a$, $F_0b$ of the reference clock pulses are equal frequencies within the range of permissible errors of crystal oscillators.

Next, when the signal pickups 11A, 11B detect the respective zero positions of video position identifying signal (a video frame No. "1" or a time code "0"), video signals from the zero positions are output from the video/audio signal conversion circuits 12A, 12B. Here, by the video position identifying signal is meant a program search mark which is recorded at a position where the synchronization of the tape is required, or a time code or an index code or an address code which has been recorded on the tape in advance. In the case of the video disk player, this refers to a video frame number or a time code which has been recorded in the disk in advance. The synchronization signal separating circuits 13A, 13B which have fetched the video signals separate the synchronization signals $F_{1a}$, $F_{1b}$ and supply them to the comparison circuits 14A, 14B as well as to the counter circuits 21A, 21B. The time when the synchronization signal $F_{1a}$ and the time when the synchronization signal $F_{1b}$ are input differ due to variations inherent in the reproducing systems 1A, 1B even if the reproduction by the reproducing systems 1A, 1B is started simultaneously. This time lag corresponds to the time duration of a discrepancy in synchronization.

The above-described case concerns one in which reproduction is started from the zero position of the video position identifying signal. However, the same also applies to cases where the signal pickups 11A, 11B search desired intermediate positions, and reproduction is started midway in the disks. In this case, designated video position identifying signals are independently searched by the pickups 11A, 11B, respectively, in the reproducing systems 1A, 1B. After completion of search, the synchronization signals $F_{1a}$, $F_{1b}$ are input to the counter circuits 21A, 21B. However, as for the time when the input is initiated, there is a time lag between the reproducing systems 1A, 1B.

The synchronization signals $F_{1a}$, $F_{1b}$ that are input to the counter circuits 21A, 21B are integrated therein. This integrating system is such that, for instance, in a case where the reproducing system 1A is advanced ahead of the reproducing system 1B and the time lag is T sec., the counter circuit 21A further integrates [$F_{1a}$ pulses/sec.$\times$T sec.] by the time when the counter circuit 21 B starts integration. The integrated values (A), (B) of the counter circuits 21A, 21B are input to the advance/delay determination circuit 22. Simultaneously as that one of the integrated values (A), (B) that is ahead is input, the determination circuit 22 starts determination ($t_1$ shown in FIG. 2),. and outputs to the data control oscillating circuits 23A, 23B the $D_1$, $D_2$ with a DC voltage substantially proportional to the magnitude of the difference in the integrated values inputs and with the polarity of advance or delay added thereto. For instance, the output polarity is set to "negative" with respect to the advanced side and to "positive" with respect to the delayed side.

<Operation in Cases where the Reproducing System 1A is Advanced Ahead of the Reproducing System 1B>

The data $D_1$ whose polarity is negative is input to the oscillating circuit 23A at a voltage corresponding to the difference between the integrated values (A), (B) or, in case where the reproducing system 1B has not started integration, corresponding to the integrated value (A). Since this data $D_1$ is superposed on a bias voltage in the input terminal, the frequency $F_{2a}$ generated by the oscillating circuit 23A is set at a level lower than the frequency $F_{0a}$ of the reference clock pulse by an amount equivalent to the superposed portion, as shown in FIG. 2. Meanwhile, in the above-described case, since the data $D_2$ whose polarity is positive has been input to the oscillating circuit 23B at the same voltage as the one mentioned above, and since this data $D_2$ is superposed on the bias voltage at the input terminal, the frequency $F_{2b}$ generated by the oscillating circuit 23B is set at a frequency higher by an amount equivalent to the superposed portion than the frequency $F_{0b}$ of the reference clock pulse, as shown in FIG. 2. As such, the frequencies $F_{2a}$, $F_{2b}$ outputs from the oscillating circuits 23A, 23B are input to the comparison circuits 14A, 14B via the 'b' sides of the electronic switches 24A, 24B. Consequently, the control loops A, B are operated, and the frequency of the synchronization signal $F_{1a}$ on the control loop A side becomes lower by an amount equivalent to the superposed portion than the frequency $F_{0a}$ of the reference clock pulse by following the generated frequency $F_{2a}$. At the same time, the frequency of the synchronization signal $F_{1b}$ on the control loop B side becomes higher by an amount equivalent to the superposed portion than the frequency $F_{0b}$ of the reference clock pulse by following the generated frequency $F_{2b}$. Then, the frequency of the synchronization signal $F_{1a}$ input to the counter circuit 21A becomes low, and the count-up speed of the counter circuit 21A decreases. At the same time, the frequency of the synchronization signal $F_{1b}$ input to the counter circuit 21B becomes high, and the count-up speed of the counter circuit 21B increases. As a result, the difference between the integrated values (A) and (B) of the counter circuits 21A, 21B becomes gradually small, and, as shown in FIG. 2, the generated frequencies $F_{2a}$, $F_{2b}$ gradually approach the frequencies $F_{0a}$, $F_{0b}$ of the reference clock pulses. Thus when the integrated values (A), (B) have finally become equal, the advance/delay determination circuit 22 sets the output data $D_1$, $D_2$ at zero. At this time, the video information of the reproducing system 1A and that of the reproducing system 1B are completely synchronized. Moreover, the outputs from the data control oscillating circuits 23A, 23B are either equal to the frequencies $F_{0a}$, $F_{0b}$ of the reference clock pulses or very close thereto. Hence, when the integrated values (A), (B) of the counter circuits 21A, 21B coincide, the advance/delay determination circuit 22 sets the output data $D_1$, $D_2$ at zero, and, at the same time, outputs a coincidence signal, thereby changing over the electronic switches 24A, 24B into the 'a' sides at $t_2$ shown in FIG. 2.

Consequently, the inputs of the comparison circuits 14A, 14B are changed over from $F_{2a}$, $F_{2b}$ into the outputs $F_{0a}$, $F_{0b}$ delivered from the reference clock generators 18A, 18B. Subsequently, the rotational speeds of the motors of the reproducing systems 1A, 1B are controlled by highly accurate reference clock signals and the synchronization of the video information is thereby maintained.

<Operation in Cases Where the Reproducing System 1A Lags Behind the Reproducing System 1B>

The operation in cases where the reproducing system 1A lags behind the reproducing system 1B is similar to the above-described operation. In this case, the advance/delay determination circuit 22 supplies the data F1 with a positive-polarity voltage corresponding to the difference between the integrated values (A), (B) and the data D2 with a negative-polarity voltage corresponding to said difference to the oscillating circuits 23A, 23B, respectively. Consequently, the data control oscillating circuits 23A, 23B oscillate in a manner opposite to the above-described case and operate in a similar manner.

<Example of Configuration of the Advance/Delay Determination Circuit 22>

Figure 3:
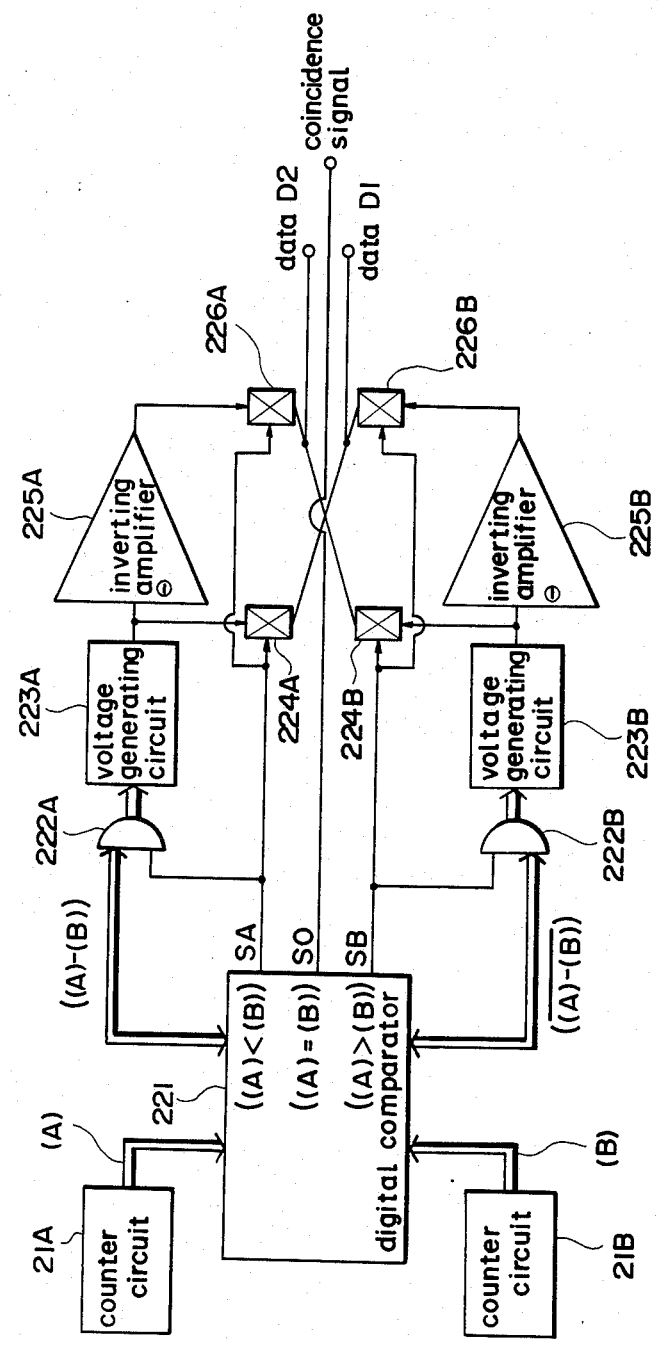
FIG. 3 is a block diagram illustrating an example of the configuration of an advance/delay determination circuit.

FIG. 3 is a block diagram illustrating an example of the configuration of the advance/delay determination circuit 22.

In FIG. 3, a digital comparator 221 compares the integrated values (A), (B) sent from the counter circuits 21A, 21B and outputs any one of a signal SA which is 1 '1' when (A)<(B), a signal SB which is '1' when (A)>(B), L . and a signal S0 which is '1' when (A)=(B). At the same time, the digital comparator 221 outputs difference $\{(A)-(B)\}$, $\{\overline{(A)-(B)}\}$ of the integrated values. The difference $\{(A)-(B)\}$ is supplied to a voltage generating circuit 223A via a gate 222A, while the difference $\{\overline{(a)-(B)}\}$ is supplied to a voltage generating circuit 223B via a gate 222B. The voltage output from the voltage generating circuit 223A is supplied to an analog switch 224A, and is also supplied to an analog switch 226A via an inverting amplifier 225A. The voltage output from the voltage generating circuit 223B is supplied to an analog switch 224B, and is also supplied to an analog switch 226B via an inverting amplifier 225B.

The output SA from the comparator 221 is supplied to the gate input terminal of the gate 222A and the gate input terminals of the analog switches 224A, 226A. Meanwhile, the output SB is supplied to the gate input terminal of the gate 222B and the gate input terminals of the analog switch 224B, 226B. The analog switches 224A and 226B and the switches 224B and 226A are respectively connected to each other. The data D1 is output from the connecting portion of the analog switches 224A, 226B, and the data D2 is output from the connecting portion of the analog switches 224B, 226A.

For instance, when the integrated value (A) is greater than (B), the output SB is delivered from the comparator 221, and the difference $\{\overline{(A)-(B)}\}$ thereof is output therefrom. The gate 222B is opened by the output SB, and an output voltage corresponding to the difference $\{(A)-(B)\}$ is generated by the voltage generating circuit 223B. The positive voltage from this generating circuit 223B is output as the data D2 via the analog switch 224B, and a signal of an opposite polarity and the same voltage is output as data D1 via the analog switch 226B. As such, as the difference $\{\overline{(A)-(B)}\}$ becomes smaller, the voltage output from the voltage generating circuit 223B becomes smaller. Similarly, a voltage output from the inverting amplifier 225B also becomes smaller, and both of the data D1, D2 come to have zero voltages. As a result, the data control oscillating circuits 23A, 23B assume normal bias voltages, and the generated frequencies $F_{2a}$, $F_{2b}$ become equal to the frequencies $F_{0a}$, $F_{0b}$ of the reference clock pulses or those which are very close thereto.

In the above, description has been made of an embodiment in cases where two video disk players are used, but the present invention can similarly be applied to cases where video tape recorders are used. In addition, the present invention can also be applied to a system employing three or more reproducing systems. Although in the above-described embodiment, the rotational speed of the motors are controlled from both the advanced and delayed sides, in case where three or more reproducing systems are employed it is also possible to synchronize a plurality of items of video information, as in the case of the above-described embodiment, by using as a reference the integrated value of the counter circuit of one reproducing system among the systems, by comparing this reference value with the integrated values of other reproducing systems, by determining the state of advance or delay, and by correspondingly controlling the rotational speeds of the motors of the other reproducing systems.

What is claimed is:

1. A method of synchronizing reproduction using a plurality of video information reproducing systems, comprising the steps of:
   (a) searching and detecting a required video position identifying signal among the various items of video information recorded on each recording medium of said plurality of reproducing systems; as
   (b) picking up video signals at the same time performing said detection;
   (c) integrating for each of said recording media synchronization pulse signals included in said video signals using said video position identifying signal as a starting point;
   (d) determining the advance and delay of video information by comparing the respective integrated values;
   (e) controlling the reproducing speeds of said respective recording media on the basis of the result of said determination in such a manner that said integrated values coincide with each other; and
   (f) setting the reproducing speeds of said respective recording media in a steady state when said integrated values coincide with each other.

2. A method of synchronizing reproduction according to claim 1, wherein, when the integrated value of said recording medium is smaller than the integrated value of the other recording medium with which it is being compared, the reproducing speed of said recording medium is accelerated.

3. A method of synchronizing reproduction according to claim 1, wherein, when the integrated value of said recording medium is greater than the integrated value of the other recording medium which it is being compared, the reproducing speed of said recording medium is decelerated.

4. A method of synchronizing reproduction according to claim 1, wherein, when the integrated value of said recording medium is smaller than the integrated value of the other recording medium with which it is being compared, the reproducing speed of said recording medium is accelerated, while, when the integrated value of said recording medium is greater than the integrated value of said other recording medium with which it is being compared, the reproducing speed of said recording medium is decelerated.

5. A method of synchronizing reproduction according to claim 1, wherein said video position identifying signal is a program search mark which is recorded in said recording medium in advance.

6. A method of synchronizing reproduction according to claim 1, wherein said video position identifying signal is a time code which is recorded in said recording medium in advance.

7. A method of synchronizing reproduction according to claim 1, wherein said video position identifying signal is an index code which is recorded in said recording medium in advance.

8. A method of synchronizing reproduction according to claim 1, wherein said video position identifying signal is an address code which is recorded in said recording medium in advance.

9. A method of synchronizing reproduction according to claim 1, wherein said video position identifying signal is a video frame number which is recorded in said recording medium in advance.

10. A method of synchronizing reproduction according to claim 1, wherein said synchronization pulse signal is a horizontal synchronization pulse signal which is included in said video signals.

11. A method of synchronizing reproduction according to claim 1, wherein said synchronization pulse signal is a vertical synchronization pulse signal which is included in said video signals.

12. An apparatus for synchronizing reproduction using a plurality of video information reproducing systems, comprising:
 (a) a plurality of reproducing systems each adapted to detect a required video position identifying signal from a recording medium, separate synchronization pulse signals from video signals picked up at the same time that said detection is being performed, and control the reproducing speed of said recording medium on the basis of a signal representing the advance or delay of video information input from the outside;
 (b) counter circuits for integrating synchronization pulse signals for each of said recording media using said video position identifying signal as a starting point;
 (c) a determination circuit for comparing the integrated values and determining advance or delay of the video information of said respective recording media;
 (d) oscillating circuits for generating a signal of a frequency corresponding to the amount of advance or delay determined for each of said recording media; and
 (e) switches each adapted to change over a signal serving as a reference for the reproducing speed of said recording medium from an output of said oscillating circuit to an output of a reference clock generator.

13. An apparatus for synchronizing reproduction according to claim 12, wherein said recording medium is a magnetic tape.

14. An apparatus for synchronizing reproduction according to claim 12, wherein said recording medium is a CAV-type disk.

15. An apparatus for synchronizing reproduction according to claim 12, wherein said recording medium is a CLV-type disk.

* * * * *